United States Patent [19]

Lodoen et al.

[11] Patent Number: 4,895,902

[45] Date of Patent: Jan. 23, 1990

[54] HINDERED TERTIARY AMINE AMINOALKYL METHACRYLATE STABILIZER FOR SPANDEX

[75] Inventors: Gary A. Lodoen, fishersville; Arnoldus J. Ultee, Afton, both of Va.

[73] Assignee: E. I. DuPont De Nemours and Company, Wilmington, Del.

[21] Appl. No.: 228,805

[22] Filed: Jul. 28, 1988

[51] Int. Cl.[4] .................. C08L 75/06; C08L 75/08; C08L 75/12
[52] U.S. Cl. .................................... 525/128; 525/127
[58] Field of Search ............................ 525/128, 127

[56] References Cited

U.S. PATENT DOCUMENTS

| | | | |
|---|---|---|---|
| 3,428,711 | 2/1969 | Hunt | 525/127 |
| 3,441,365 | 4/1969 | Lowell et al. | 525/128 |
| 3,773,857 | 11/1973 | Kondo et al. | 525/128 |
| 3,896,753 | 7/1975 | Shepherd et al. | 523/122 |
| 4,296,174 | 10/1981 | Hanzel et al. | 524/601 |
| 4,340,527 | 7/1982 | Martin | 524/590 |
| 4,504,612 | 3/1985 | Ketterer | 524/310 |
| 4,810,737 | 3/1989 | Dickerson | 524/590 |

*Primary Examiner*—Lewis T. Jacobs
*Assistant Examiner*—Robert E. L. Sellers, II

[57] ABSTRACT

An improved spandex composition is provided in which a polymeric hindered tertiary amine stabilizer is present. The polymeric amine is poly(diisopropylaminoethyl methacrylate/hydroxybutyl acrylate) or poly(diisopropylaminoethyl methacrylate/ethyl acrylate).

7 Claims, No Drawings

HINDERED TERTIARY AMINE AMINOALKYL METHACRYLATE STABILIZER FOR SPANDEX

BACKGROUND OF THE INVENTION

1. Field of the Invention

This invention relates to a polymeric tertiary amine stabilizer for polyurethane polymer. More particularly, the invention concerns an improvement in such a stabilizer to make it especially suited for use with polyurethane/urea spandex fibers and films.

2. Description of the Prior Art

Hunt, U.S. Pat. No. 3,428,711, suggests use of polymeric tertiary-aminoalkyl acrylates and methacrylates for stabilizing segmented polyurethanes. A preferred stabilizer of Hunt, which has found much commercial use in spandex fibers is a copolymer of sterically hindered diisopropylaminoethyl methacrylate (hereinafter referred to as "DIPAM") and n-decyl methacrylate (hereinafter "DM"). The copolymer (hereinafter "poly(DIPAM/DM)") provides spandex polymer with greater resistance to degradation upon exposure o chlorine than similar amines which are not sterically hindered.

Although the known polymeric hindered tertiary amine additives are useful in preventing degradation and discoloration of spandex polymers, these additives also can cause manufacturing problems and/or poor properties in fibers made from the spandex polymer. For example, use of poly(DIPAM/DM) additive has been found to cause certain problems in the dry-spinning of filaments from spandex polymer solutions. Dimethylacetamide (hereinafter "DMAc") is the most frequently used solvent for preparing the spandex polymer solutions. The poly(DIPAM/DM) and other additives, such as antioxidants and pigments, are usually formed into a slurry with DMAc and then mixed with spandex polymer solution prior to spinning. However, such slurries, which usually are prepared at room temperature, can undergo phase separation when the polymeric amine lacks solubility in the DMAc solvent. Phase separation can lead to agglomeration of the additive, problems in spinning and/or nonuniform distribution of the additives in the spinning solution and in the filaments spun therefrom. Use of poly(DIPAM) homopolymer, which is quite soluble in DMAc, causes an undesired reduction in elasticity (i.e., set) of the dry-spun spandex filaments.

It is an object of the present invention to provide in a spandex polymer, a polymeric, hindered tertiary amine additive that protects the spandex polymer against degradation and discoloration and avoids, or at least significantly reduces, the above-described problems related to use of the known polymeric, hindered tertiary amines.

SUMMARY OF THE INVENTION

The present invention provides an improved spandex polymer composition which contains a hindered tertiary amine copolymer additive. The additive is formed from diisopropylaminoethyl methacrylate and a comonomer. The improvement comprises the comonomer being selected from hydroxybutyl acrylate and ethyl acrylate. Spandex polymer with additives in accordance with the invention not only possess good resistance to degradation and discloration but also exhibit superior processability and set characterisitics in comparison to such polymers containing known polymeric tertiary amine additives.

DETAILED DESCRIPTION OF PREFERRED EMBODIMENTS

As use herein, the term "spandex" means a long chain synthetic elastomeric composition that comprises at least 85% by weight segmented polyurethane. Segmented polyurethanes are well known and can be made by reacting a polymeric diol (most often a polyether glycol or a polyester glycol) with an organic diisocyanate to form an isocyanate-terminated polymer which is chain-extended by reaction with a diamine or a diol. "Fiber" includes in its meaning staple fibers and continuous filaments. The additive in accordance with the present invention is especially useful in polyurethane/urea spandex fibers.

The present invention provides improved spandex compositions that contain polymeric, hindered tertiary-aminoalkyl acrylate and methacrylate additives. The additives are of the general type disclosed by Hunt, U.S. Pat. No. 3,428,711, column 3, line 35, through column 4, line 17, which disclosure is hereby incorporated herein by reference. Hunt discloses a large number of such additives. The most commonly used such additive is poly(DIPAM/DM). However, as noted above, spandex polymers containing poly(DIPAM/DM) or poly(-DIPAM) additive have certain shortcomings in the spinning and/or elasticity of filaments produced from the spandex polymer. As shown hereinafter in Examples 1 and 2, most of the polymeric tertiary-aminoalkyl acrylate and methacrylate additives suffer from one or the other or both of these shortcomings. However, these shortcomings are substantially overcome by the two particular polymeric tertiary-aminoalkyl acrylates or methacrylates of the invention.

The two polymeric tertiary amine additives that are suitable for use in the present invention are each copolymers of diisopropylaminoethyl methacrylate (DIPAM). In one additive according to the invention, the comonomer is hydroxybutyl acrylate and in the other additive, the comonomer is ethyl acrylate. The DIPAM monomer in the copolymer additive usually amounts to between 60 to 90 mole percent of the copolymer. The preferred amount of DIPAM in the copolymer is in the range of 70 to 80 mole percent.

The poly(diisopropylaminoethyl methacrylate/hydroxybutyl acrylate) and poly(diisopropylaminoethyl methacrylate/ethyl acrylate) additives of the invention can be prepared from diisopropylaminoethyl methacrylate and hydroxybutyl acrylate or ethly acrylate by conventional techniques, such as those described by Graves, U.S. Pat. No. 2,138,763, the disclosure of which is hereby incorporated herein by reference. Detailed procedures for the preparation of these copolymer additives also are given in Examples 1 and 2 below. Generally, these copolymer additives have a falling ball viscosity in the range of 900 to 2,100 centipoise (0.9 to 2.1 Pascal.seconds), preferably in the range of 1,250 to 1,750 centipoise (1.25 to 1.75 Pascal-seconds).

The amount of additive useful in protecting the spandex polymer in accordance with the invention may vary over a wide range, usually, from as little as 0.5 percent to as much as 10 percent, by weight of the spandex polymer. Preferably, the additive concentration is in the range of 2 to 6 percent.

The tertiary amine copolymer additives in accordance with the invention can be incorporated into the spandex polymer by various known procedures, such as those disclosed by Hunt, U.S. Pat. No. 3,428,711, column 5 lines 1-16, the disclosure of which is hereby incorporated herein by reference, and as indicated in Examples 1 and 2 below.

Other additives, fillers, plasticizers, pigments and the like, which are conventionally used with segmented polyurethanes, may be used as desired with the additives of the invention. In addition to useful applications in fibers and films, polyurethane polymers containing tertiary amine copolymers in accordance with the invention may be formed into other types of shaped articles, as for example, by molding.

In the Examples below and in other places in the specification, measurements are reported for the set in a spandex strand after a simulated fiber-finishing treatment. In the simulated treatment, samples of spandex film, measuring about 3 mm width and containing the various additives under test, were clamped in a frame at a 50% elongation to simulate the stretch of a spandex fiber incorporated in fabric. The frame was then immersed for 30 minutes in an aqueous solution of 4.5 grams/liter of tetrasodium pyrophosphate and 4.5 grams/liter of "Duponol EP" (a diethanolamine lauryl sulfate detergent, sold by E. I. Du Pont de Nemours & Co. of Wilmington, Delaware). Solution pH was maintained at about 5 by addition of acetic acid and the bath was maintained at a temperature of 90° C. Set of the thusly treated sample was determined after the samples had been removed from the bath and dried.

The solubility of tertiary amine polymer or copolymer additive in N,N-dimethylacetamide (DMAc) was measured by mixing the additive and DMAc in a glass vessel to make a solution (or mixture) containing 60% by weight of the additive. The contents of the vessel, while being maintained at a temperature of 35° C., were stirred for 3 to 5 minutes. The solubility of the additive was rated as "good", if the mixture (or solution) was clear, and as "poor", if the mixture was cloudy. It was noted if the solubility of the additive was poor, then dry-spinning of spandex polymer solution containing the additive, was usually accompanied by the same kind of processing shortcomings that had been noted in spinning spandex polymer solutions containing poly(-DIPAM/DM).

Elastic properties of spandex strands were measured according to the general method described in ASTM D 2731-72. In the examples, a sample strip of 3-mm width, a 2-inch (5-cm) gauge length and a 0-to-300% elongation cycle were used for each measurement. "Set" was determined after the samples had been cycled five times between 0 and 300% extension at an constant elongation rate of 800%/minute and then held at a 300% extension for half a minute during the fifth extension. The length (called "final length") to which the sample returned at the end of the fifth cycle was measured. Set is defined as the difference between the original and final length, expressed as a percentage of the original length. Fiber or film made from spandex polymer according to the invention generally has a set of no greater than 25%, preferably, no greater than 20%.

The following examples, in which all parts and percentages are by weight, are intended to illustrate, but not limit, the invention which is defined by the claims appended hereto.

EXAMPLES 1 and 2

In these Examples spandex polymer containing copolymer tertiary amine additive in accordance with the invention is compared with eight samples of the same spandex polymer containing tertiary amine additives that are outside the invention. The superiority in set of the examples of the invention over the comparison samples is clearly shown in the examples. The advantage in solubility in DMAc of the tertiary amine copolymer additives of the invention over the additives of the comparison samples is also demonstrated.

The polymeric amine additives for the spandex polymer were prepared in equipment that included a 2-liter flask equipped with a stirrer, a thermometer, dropping funnels, means for producing vacuum, and a supply of nitrogen. The flask was evacuated, checked for air leaks, and three reduced pressure nitrogen purges were made. The following weights of ingredients were added to the flask through a dropping funnel:

280 g dimethyl acetamide (DMAc)
120 g comonomer (see list in Table I below)
360 g diisopropylaminoethyl methacrylate (DIPAM)

A separate solution was prepared of 4.5 grams of "VAZO 64" (azo-bis-isobutyro-nitrile initiator sold by E. I. du Pont de Nemours and Company, Wilmington, Del.) in 27.7 grams of DMAc. The initiator solution was then placed in a dropping funnel attached to the flask. The contents of the flask were heated to 79° C. Then 5.0 ml of initiator solution were added to the flask. An exotherm was observed, during which the temperature was allowed to increase to about 98° C. and then decrease to 79° C. One hour after the start of the first addition and with the contents of the flask at 79° C., another 5.4 ml of initiator solution were added. No exotherm was observed. The contents of the flask were maintained at 79° C. Thereafter, at one-hour intervals, with the temperature at 79° C. (unless indicated otherwise), the following volumes (in cubic centimeters) of initiator solution were added to the flask, in succession: 6.15; 10.0; 2.7 (with the temperature increased to and maintained at 84° C. for all subsequent additions); 2.7; and 2.3. The resulting solution was agitated, while at 84° C., for 2 hours. The solution was then cooled to about 45° C. and discharged from the flask. Note that instead of adding the initiator incrementally as was done for these examples, substantially equivalent results can be obtained when the initiator solution is added uniformly and continuously.

A solution of polyurethane/urea polymer in N,N-dimethylacetamide (DMAc) was prepared in accordance with the procedure of U.S. Pat. No. 4,340,527, Example I, column 4, line 47, through column 5, line 3, which disclosure is hereby incorporated by reference. The polymer solution contained approximately 36% solids and had a viscosity, measured at 40° C., of about 2100 poises (210 Pascal sec).

The polymeric amines made as described above were added to the viscous polymer solution along with 1,1-bis(3-t-butyl-6-methyl-4-hydroxy-phenyl)butane antioxidant, titanium dioxide and ultramarine blue pigment to provide concentrations of 4.7, 1.0, 4.7 and 0.01%, respectively, based on the total weight of solids in the solution. The solubility in DMAc of each of the amine copolymer additives in DMAc was observed.

Films were cast from the polymer solutions to form samples containing the different DIPAM copolymers. The films were dried for about 12 hours at 70° C., cut into strips, exposed to the simulated fiber-finishing procedure and then measured for set. The table below summarizes the results for the soluble copolymers.

TABLE I

Spandex Films with Different Polymeric Amine Additives

| Comonomer* | Percent Set | DMAc Solubility |
|---|---|---|
| Of the invention | | |
| Ex. 1. Hydroxybutyl Acrylate | 23 | good |
| Ex. 2. Ethyl Acrylate | 23 | good |
| Other comonmers - Comparisons | | |
| a. Decyl methacrylate | 19 | poor |
| b. None, i.e., poly(DIPAM)* | 29 | good |
| c. Methyl methacrylate | 36 | good |
| d. Butyl methacrylate | 30 | good |
| e. Dimethylacrylamide | 31 | good |
| f. Hydroxyethyl methacrylate | 34 | good |
| g. Hydroxyethyl acrylate | 33 | good |
| h. Ethylhexyl methacrylate | 26 | good |

*All samples, except b, were copolymerized with DIPAM.

The preceding table shows that incorporation in the spandex of DIPAM copolymer, made according to the invention with hydroxybutyl acrylate or ethyl acrylate, resulted in films having the lowest set of all the DMAc-soluble copolymers tested. In addition, films containing the additives of the invention performed very well in degradation and discoloration exposure tests.

EXAMPLE 3

The polymer and polymeric amine preparation procedures of Examples 1 and 2 were repeated, except for the combination of additives, which in this Example consisted of (a) a copolymer of DIPAM, (b) "Cyanox" 1790 a 1,3,5-tris(4-t-butyl-3-hydroxy-2,6-dimethylbenzyl)1,3,5-triazine-2,4,6(1H,3H,5H)trione) antioxidant sold by American Cyanamid and (c) poly(dimethylsiloxane) and amounted to concentrations, based on the total weight of the solids in solution, of 2.0, 1.5 and 0.6 percent, respectively. Films cast from the polymer solutions were compared as in Examples 1 and 2. Two copolymers of DIPAM were tested: ethyl acrylate (Example 3) and decyl methacrylate (Comparison i). For Comparison j, no polymeric amine additive was present. Table II summarizes the results.

TABLE II

| Comonomer of DIPAM | Percent Set | DMAc Solubility |
|---|---|---|
| Example 3 - Ethyl Acrylate | 18.3 | good |
| Comparison i - Decyl methacrylate | 16.8 | poor |
| Comparison j - No polymeric amine | 16.7 | — |

Example 2 above, in which the concentration of polymeric amine additive was 4.7%, showed that films containing the poly(DIPAM/ethyl acrylate) had a set of 23% versus 19% for films with the same concentration of poly(DIPAM/DM). This Example 3, wherein the concentration of polymeric amine additive was 2%, showed that the percent set of films containing the poly(DIPAM/ethyl acrylate) additive was again only slightly greater than that of films with poly(DIPAM/DM) or with no polymeric amine additive at all. However, the poly(DIPAM/ethyl acrylate) has great advantage in solubility (which leads to much superior processing) over the poly(DIPAM/DM) additive.

We claim:

1. In an improved spandex composition which contains a hindered tertiary amine copolymer additive formed from diisopropylaminoethyl methacrylate and a comonomer, the improvement comprising the comonomer being hydroxybutyl acrylate or ethyl acrylate.

2. A spandex composition according to claim 1 wherein the diisopropylaminoethyl methacrylate monomer in the copolymer additive amounts to between 60 to 90 mole percent of the copolymer additive.

3. A spandex composition according to claim 2 wherein the diisopropylaminoethyl methacrylate amounts to between 70 to 80 mole percent of the copolymer additive.

4. A spandex composition according to claim 1 wherein the amine copolymer additive is present in a concentration in the range of 0.5 to 10 percent based on the weight of the spandex polymer.

5. A spandex composition according to claim 4 wherein the amine copolymer additive concentration is in the range of 2 to 6 percent.

6. A spandex composition according to claims 1, 2, 3, 4 or 5 wherein the spandex composition is in the form of a fiber or film having a set of no greater than 25%.

7. A spandex composition according to claims 1, 2, 3, 4 or 5 wherein the spandex composition is in the form of a fiber or film having a set of no greater than 20%.

* * * * *